(12) United States Patent
Kassayan

(10) Patent No.: US 8,867,994 B2
(45) Date of Patent: *Oct. 21, 2014

(54) SIGNAL TRANSMISSION VIA BODY CONDUCTION

(71) Applicant: Sonitus Medical, Inc., San Mateo, CA (US)

(72) Inventor: Reza Kassayan, Atherton, CA (US)

(73) Assignee: Sonitus Medical, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,991

(22) Filed: Aug. 5, 2013

(65) Prior Publication Data

US 2013/0324043 A1    Dec. 5, 2013

Related U.S. Application Data

(63) Continuation of application No. 12/398,463, filed on Mar. 5, 2009, now Pat. No. 8,503,930.

(60) Provisional application No. 61/048,093, filed on Apr. 25, 2008.

(51) Int. Cl.
| | |
|---|---|
| *H04R 23/00* | (2006.01) |
| *H04B 5/00* | (2006.01) |
| *H04B 13/00* | (2006.01) |
| *H04R 25/00* | (2006.01) |

(52) U.S. Cl.
CPC ............ *H04B 5/0025* (2013.01); *H04B 13/005* (2013.01); *H04R 25/604* (2013.01); *H04R 2225/67* (2013.01)
USPC ......................................... 455/41.1; 381/380

(58) Field of Classification Search
USPC ............. 455/39, 41.1, 67.11; 433/71; 600/25; 381/380
See application file for complete search history.

(56) References Cited

U.S. PATENT DOCUMENTS

| | | | |
|---|---|---|---|
| 5,447,489 | A | 9/1995 | Issalene et al. |
| 6,089,864 | A | 7/2000 | Buckner et al. |
| 6,633,747 | B1 | 10/2003 | Reiss |
| 7,664,277 | B2 * | 2/2010 | Abolfathi et al. ............. 381/151 |
| 8,333,203 | B2 * | 12/2012 | Spiridigliozzi et al. ...... 128/862 |
| 8,503,930 | B2 | 8/2013 | Kassayan |
| 2004/0138723 | A1 | 7/2004 | Malick et al. |
| 2007/0280492 | A1 | 12/2007 | Abolfathi |
| 2007/0280495 | A1 | 12/2007 | Abolfathi |
| 2008/0045161 | A1 | 2/2008 | Lee et al. |
| 2009/0270032 | A1 | 10/2009 | Kassayan |

FOREIGN PATENT DOCUMENTS

WO    WO 2009/131756    10/2009

* cited by examiner

*Primary Examiner* — Dinh Le
(74) *Attorney, Agent, or Firm* — Levine Bagade Han LLP

(57) ABSTRACT

Methods and apparatus for signal transmission via body conduction are disclosed herein. The assembly may be attached, adhered, or otherwise embedded into or upon a removable oral appliance to form a bearing aid assembly. Such an oral appliance may be a custom-made device which can enhance and/or optimize received data and/or audio signals for vibrational conduction to the user. Data and/or audio signals may be encoded and transmitted or received along or through the user's body to an oral appliance contained within or along the user's mouth. Alternatively, information may be transmitted between various other devices over the user's body aside from an oral appliance. The encoded signals may be decoded and the auditory signals may be transmitted via vibrational conductance to the user.

10 Claims, 16 Drawing Sheets

SIGNAL TRANSMISSION VIA BODY CONDUCTION

CROSS-REFERENCE TO RELATED APPLICATIONS

This application is a continuation of U.S. application Ser. No. 12/398,463 filed Mar. 5, 2009 (now U.S. Pat. No. 8,503,930), which claims priority to U.S. Provisional Application Ser. No. 61/048,093, filed Apr. 25, 2008, the contents of which are incorporated by reference.

FIELD OF THE INVENTION

The present invention relates to methods and devices for near-field data communications. More particularly, the present invention relates to methods and devices for near-field data communications utilizing the transfer of signals via a human body to communicate with an oral appliance.

BACKGROUND OF THE INVENTION

With conventional near-field data communication devices using radio waves, power consumption and size of the devices tend to be relatively large when utilizing wireless communication. Wireless communication through the transmission of electromagnetic signals through air also has other drawbacks such as the potential interference by stray signals and difficulties in incorporating the necessary transmission and reception circuits into a device of a size that can be comfortably worn by the user.

One application in particular is a hearing aid system utilizing two or more components worn by a user at different locations over the user's body. During operation, it is generally desirable that one or more communication links be established between these components using wireless technology. Although interconnecting these components by wires or cables is possible, it may be undesirable to have wires passing along different parts of the body. Moreover, for certain devices which may be worn within the user's mouth, a wired device is generally undesirable.

Certain methods have been previously utilized for passing communication signals along or through the body of the user to enable the passing of data between different components. One method utilized an electrostatic field induced in a human body to reduce power consumption and by transferring high frequency modulated signals via the user's body and an earth ground. However, because ground is utilized as part of the signal path, the size of the transmitter and receiver may be particularly small to improve their wearability by the user but the distance traveled by the communications signals becomes particularly shortened.

Yet other methods may utilize the transfer of signals between separate devices using both transmission through an electric field induced over the user's body in combination with signal transmission through the air. However, this and similar methods require the use of signal transmission through an induced, electric field, and ground or still require the use of transmission through the air with its resultant power consumption and device form factors.

Accordingly, there is a need for near-field data communication devices and methods which operate with reduced power consumption, have a form factor which is suitably small for patient comfort, and which is able to communicate with devices configured for intra-oral placement and use.

SUMMARY OF THE INVENTION

An electronic and transducer device may be attached, adhered, or otherwise embedded into or upon a removable dental or oral appliance to form a hearing aid assembly. Such a removable oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

The assembly for transmitting vibrations via at least one tooth may generally comprise a housing having a shape which is conformable to at least a portion of the at least one tooth, and an actuatable transducer disposed within or upon the housing and in vibratory communication with a surface of the at least one tooth. Moreover, the transducer itself may be a separate assembly from the electronics and may be positioned along another surface of the tooth, such as the occlusal surface, or even attached to an implanted post or screw embedded into the underlying bone.

In receiving and processing the various audio signals typically received by a user, various configurations of the oral appliance and processing of the received audio signals may be utilized to enhance and/or optimize the conducted vibrations which are transmitted to the user. For instance, in configurations where one or more microphones are positioned within the user's mouth, filtering features such as Acoustic Echo Cancellation (AEC) may be optionally utilized to eliminate or mitigate undesired sounds received by the microphones. In such a configuration, at least two intra-buccal microphones may be utilized to separate out desired sounds (e.g., sounds received from outside the body such as speech, music, etc.) from undesirable sounds (e.g., sounds resulting from chewing, swallowing, breathing, self speech, teeth grinding, etc.).

In utilizing a separate transmitter in communication with the electronics and/or transducer assembly to transfer data and/or auditory information, the transmitter may be located on or near the user's body in proximity to the oral appliance. In separating the transmitter, communication between the transmitter and oral appliance may be effected by wireless communications utilizing radio waves, as described above. However, typical wireless communications assemblies require increased power levels. Thus, intra-device communications may alternatively be effected by the transmission of signals through or along the user's body itself such as along the skin or through the underlying tissue.

An example of such intra-device linked communication through the user's body may utilize an extra-buccal transmitter assembly positioned behind one or both of the user's ear. The transmitter assembly may receive the data and/or auditory information and convert this information to digitally encode and modulates the data and/or auditory information for transmission over or through the skin and/or underlying tissue. The receiver assembly contained within the retaining portion of the oral appliance is specifically keyed to receive these digitally encoded signals and to perform any error correction on the signal which is then converted to the audio signal for vibratory conductance to the user.

The transmitter assembly and receiver assembly in the retaining portion may utilize an unbalanced data transmission where the transmitter sends the digitally encoded data and waits for a predetermined period of time to receive any feedback signals or other information from the receiver, e.g., battery life, user-related data, etc., which may also be relayed from retaining portion back to the transmitting, assembly through or along the user's skin or underlying tissue.

The transmitter assembly may receive any data and/or auditory information or optional treatment algorithms which are digitally encoded via an encoding assembly. The encoding assembly may be coupled to a variable gain amplifier which locks to a base level of noise and gates the noise level accordingly in the encoded signal, which is then transmitted to a first region of the body (e.g., behind the ear, along the wrist, etc.) via a single electrode coupled to the skin surface. The electrode may be coupled directly to the skin surface or through a coupling interface such as a gel or other conductive medium. Alternatively, the electrode may be maintained in proximity to the skin surface with an intermediate protective layer or held at a distance such that no direct contact is made between the electrode and the skin surface and coupling occurs via capacitive coupling. The single electrode may eliminate the need for use of a reference voltage and may also eliminate the need for transmission through earth ground. Alternatively, additional electrodes (e.g., two electrodes) may be used to enhance signal transmission and/or reception if so desired but is not necessary for use.

Once the encoded signal is transmitted through electrode, the transmission signal may be transmitted through or along the skin or it may be transmitted through or along the underlying tissue. The transmitted signals may pass through the user's whole body or through a portion of the skin and/or underlying tissue where the power for transmitting the signal ranges in the sub-milliwatt level to a few milliwatts of power, e.g., less than 10 milliwatts.

Optionally and/or additionally, the encoding assembly may further include a scrambler which may scramble the encoded signal prior to transmission to encrypt the signal. The scrambler may transpose, invert, or otherwise further encode the signal to make the transmitted information unintelligible at the receiver assembly to prevent other unintended persons from picking up and decoding the transmitted information from the user's body. A receiving electrode which is also in contact with the user's body at a second region (e.g., within the user's mouth along, the tooth or teeth, in contact with the inner cheek, a region of the gums, a portion of the tongue, etc.) may receive the encoded signals and transmit them to an amplifier within the receiving assembly located within or along retaining portion. As the interior of the user's mouth is typically wet with saliva, the reception of the encoded signals may be particularly effective. The encoded and amplified signals may be decoded via decoding assembly and the decoded data and/or auditory information may be received by a transducer assembly which may then transmit the data and/or auditory information through vibratory conductance into the underlying third region of the user's body such as the underlying tooth or teeth.

In other variations, a pair of transmitting assemblies may be utilized behind each ear of user. In this manner, each assembly may communicate with a single receiving assembly along the retaining portion or with two or more receivers along both retaining portions. Because the user's body is utilized as a conductive transmission link, the transmitter assembly may be placed at various locations over the body. For example, a transmitter assembly may be configured as a watch and worn on the user's wrist or as a PDA, music player, etc., which may be worn on the users belt or other clothing.

DETAILED DESCRIPTION OF THE INVENTION

An electronic and transducer device may be attached, adhered, or otherwise embedded into or upon a removable oral appliance or other oral device to form a hearing aid assembly. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

Figure 1:
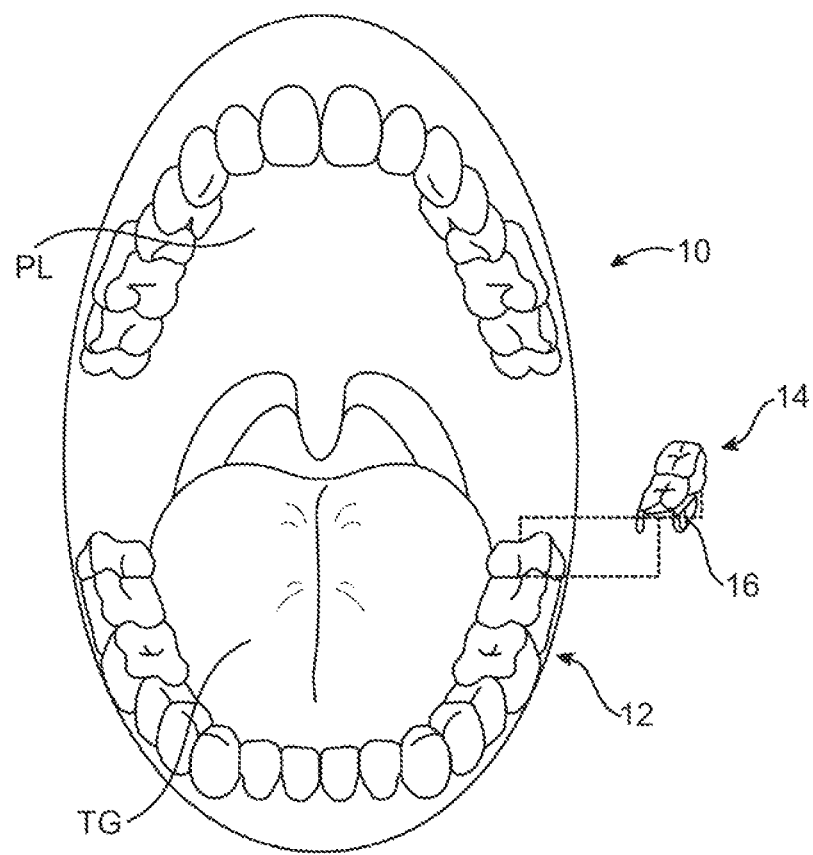
FIG. 1 illustrates the dentition of a patient's teeth and one variation of a hearing aid device which is removably placed upon or against the patient's tooth or teeth as a removable oral appliance.

As shown in FIG. 1, a patient's mouth and dentition 10 is illustrated showing one possible location for removably attaching hearing aid assembly 14 upon or against at least one tooth, such as a molar 12. The patient's tongue TG and palate PL are also illustrated for reference. An electronics and/or transducer assembly 16 may be attached, adhered, or otherwise embedded into or upon the assembly 14, as described below in further detail.

Figure 2A:
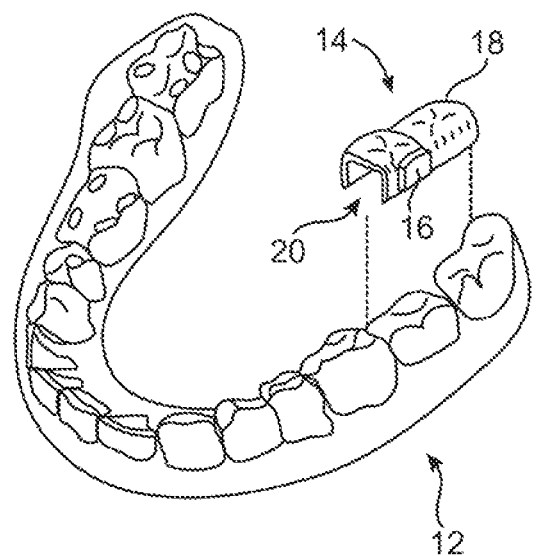
FIG. 2A illustrates a perspective view of the lower teeth showing one exemplary location for placement of the removable oral appliance hearing aid device.

FIG. 2A shows a perspective view of the patient's lower dentition illustrating the hearing aid assembly 14 comprising a removable oral appliance 18 and the electronics and/or transducer assembly 16 positioned along a side surface of the assembly 14. In this variation, oral appliance 18 may be fitted upon two molars 12 within tooth engaging channel 20 defined by oral appliance 18 for stability upon the patient's teeth, although in other variations, a single molar or tooth may be utilized. Alternatively, more than two molars may be utilized for the oral appliance 18 to be attached upon or over. Moreover, electronics and/or transducer assembly 16 is shown positioned upon a side surface of oral appliance 18 such that the assembly 16 is aligned along a buccal surface of the tooth 12; however, other surfaces such as the lingual surface of the tooth 12 and other positions may also be utilized. The figures are illustrative of variations and are not intended, to be limiting; accordingly, other configurations and shapes for oral appliance 18 are intended to be included herein.

Figure 2B:
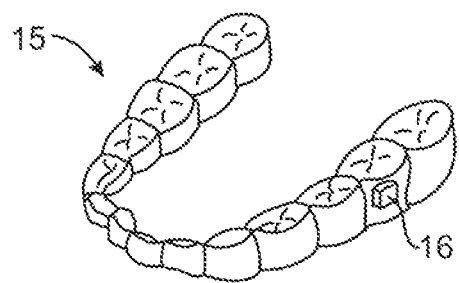
FIG. 2B illustrates another variation of the removable oral appliance in the form of an appliance which is placed over an entire row of teeth in the manner of a mouthguard.

FIG. 2B shows another variation of a removable oral appliance in the form of an appliance 15 which is placed over an entire row of teeth in the manner of a mouthguard. In this variation, appliance 15 may be configured to cover an entire bottom row of teeth or alternatively an entire upper row of teeth. In additional variations, rather than covering the entire rows of teeth, a majority of the row of teeth may be instead be covered by appliance 15. Assembly 16 may be positioned along one or more portions of the oral appliance 15.

Figure 2C:
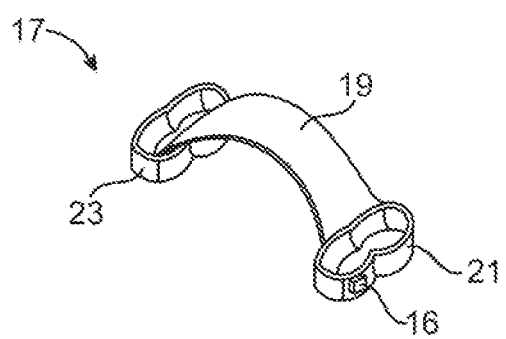
FIG. 2C illustrates another variation of the removable oral appliance which is supported by an arch.

FIG. 2C shows yet another variation of an oral appliance 17 having an arched configuration. In this appliance, one or more tooth retaining portions 21, 23, which in this variation may be placed along the upper row of teeth, may be supported by an arch 19 which may lie adjacent or along the palate of the user. As shown, electronics and/or transducer assembly 16 may be positioned along one or more portions of the tooth retaining portions 21, 23. Moreover, although the variation shown illustrates an arch 19 which may cover only as portion of the palate of the user, other variations may be configured to have an arch which covers the entire palate of the user.

Figure 2D:
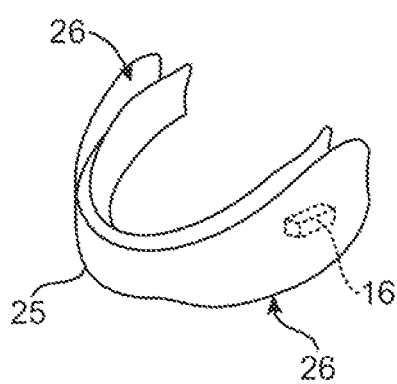
FIG. 2D illustrates another variation of an oral appliance configured as a mouthguard.

FIG. 2D illustrates yet another variation of an oral appliance in the form of a mouthguard or retainer 25 which may be inserted and removed easily from the user's mouth. Such a mouthguard or retainer 25 may be used in sports where conventional mouthguards are worn; however, mouthguard or retainer 25 having assembly 16 integrated therein may be utilized by persons, hearing impaired or otherwise, who may simply hold the mouthguard or retainer 25 via grooves or channels 26 between their teeth for receiving instructions remotely and communicating over a distance.

Generally, the volume of electronics and/or transducer assembly 16 may be minimized so as to be unobtrusive and as comfortable to the user when placed in the mouth. Although the size may be varied, a volume of assembly 16 may be less than 800 cubic millimeters. This volume is, of course, illustrative and not limiting as size and volume of assembly 16 and may be varied accordingly between different users.

Moreover, removable oral appliance 18 may be fabricated from various polymeric or a combination of polymeric and metallic materials using any number of methods, such as computer-aided machining processes using computer numerical control (CNC) systems or three-dimensional printing processes, e.g., stereolithography apparatus (SLA), selective laser sintering (SLS), and/or other similar processes utilizing three-dimensional geometry of the patient's dentition, which may be obtained via any number of techniques. Such techniques may include use of scanned dentition using intra-oral scanners such as laser, white light, ultrasound, mechanical three-dimensional touch scanners, magnetic resonance imaging (MRI), computed tomography (CT), other optical methods, etc.

In forming the removable oral appliance 18, the appliance 18 may be optionally formed such that it is molded to fit over the dentition and at least a portion of the adjacent gingival tissue to inhibit the entry of food, fluids, and other debris into the oral appliance 18 and between the transducer assembly and tooth surface. Moreover, the greater surface area of the oral appliance 18 may facilitate the placement and configuration of the assembly 16 onto the appliance 18.

Additionally, the removable oral appliance 18 may be optionally fabricated to have a shrinkage factor such that when placed onto the dentition, oral appliance 18 may be configured to securely grab onto the tooth or teeth as the appliance 18 may have a resulting size slightly smaller than the scanned tooth or teeth upon which the appliance 18 was formed. The fitting may result in a secure interference fit between the appliance 18 and underlying dentition.

Figure 3:
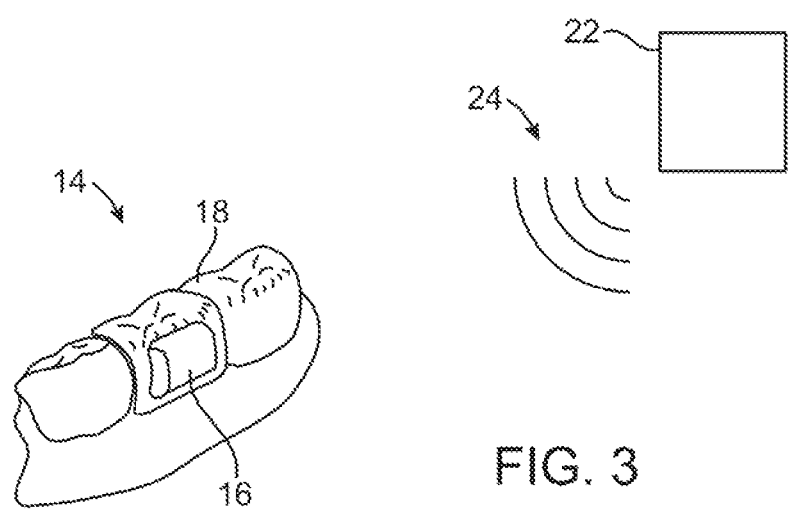
FIG. 3 illustrates a detail perspective view of the oral appliance positioned upon the patient's teeth utilizable in combination with a transmitting assembly external to the mouth and wearable by the patient in another variation of the device.

In one variation, with assembly 14 positioned upon the teeth, as shown in FIG. 3, an extra-buccal transmitter assembly 22 located outside the patient's mouth may be utilized to receive auditory signals for processing and transmission via a wireless signal 24 to the electronics and/or transducer assembly 16 positioned within the patient's mouth, which may then process and transmit the processed auditory signals via vibratory conductance to the underlying tooth and consequently to the patient's inner ear.

The transmitter assembly 22, as described in further detail below, may contain a microphone assembly as well as a transmitter assembly and may be configured in any number of shapes and forms worn by the user, such as a watch, necklace, lapel, phone, belt-mounted device, etc.

Figure 4:
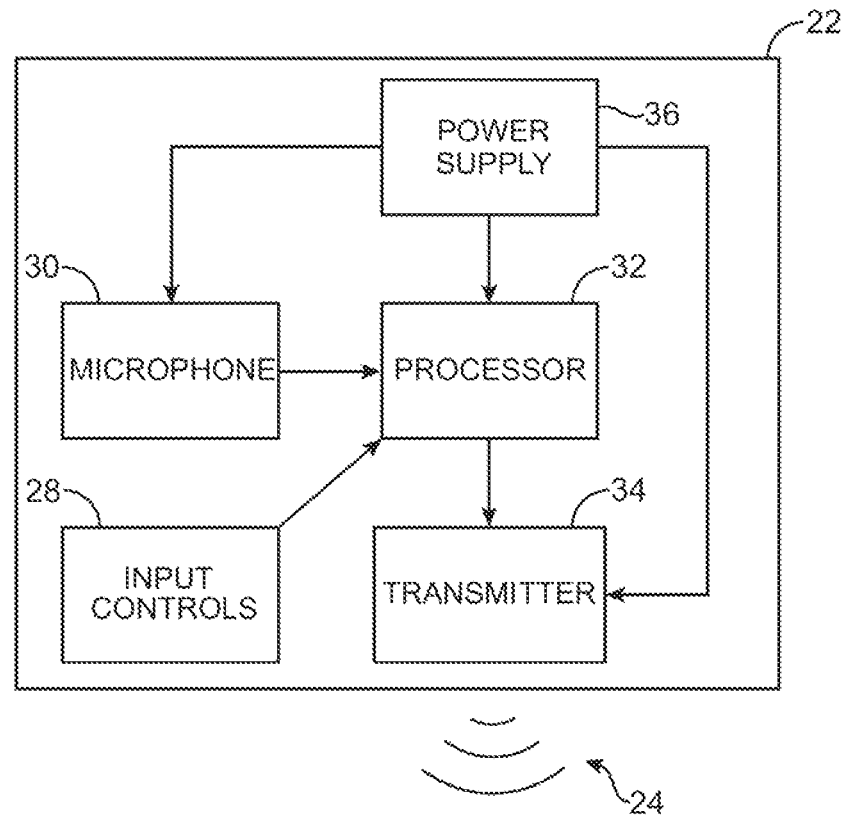
FIG. 4 shows an illustrative configuration of one variation of the individual components of the oral appliance device having an external transmitting assembly with a receiving and transducer assembly within the mouth.
Figure 4:
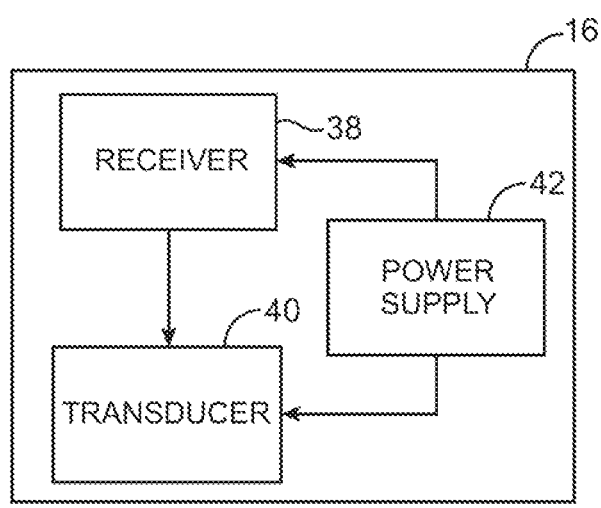

FIG. 4 illustrates a schematic representation of one variation of hearing aid assembly 14 utilizing an extra-buccal transmitter assembly 22, which may generally comprise microphone or microphone array 30 (referred to "microphone 30" for simplicity) for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired. Moreover, various configurations and methods for utilizing multiple microphones within the user's mouth may also be utilized, as further described below.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22 may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via receiver 38, which may be connected to an internal processor for additional processing of the received signals. The received signals may be communicated to transducer 40, which may vibrate correspondingly against a surface of the tooth to conduct the vibratory signals through the tooth and bone and subsequently to the middle ear to facilitate hearing of the user. Transducer 40 may be configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 Hz to 20,000 Hz.

Power supply 42 may also be included with assembly 16 to provide power to the receiver, transducer, and/or processor, if also included. Although power supply 42 may be a simple battery, replaceable or permanent, other variations may include a power supply 42 which is charged by inductance via an external charger. Additionally, power supply 42 may alternatively be charged via direct coupling to an alternating current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

Figure 5:
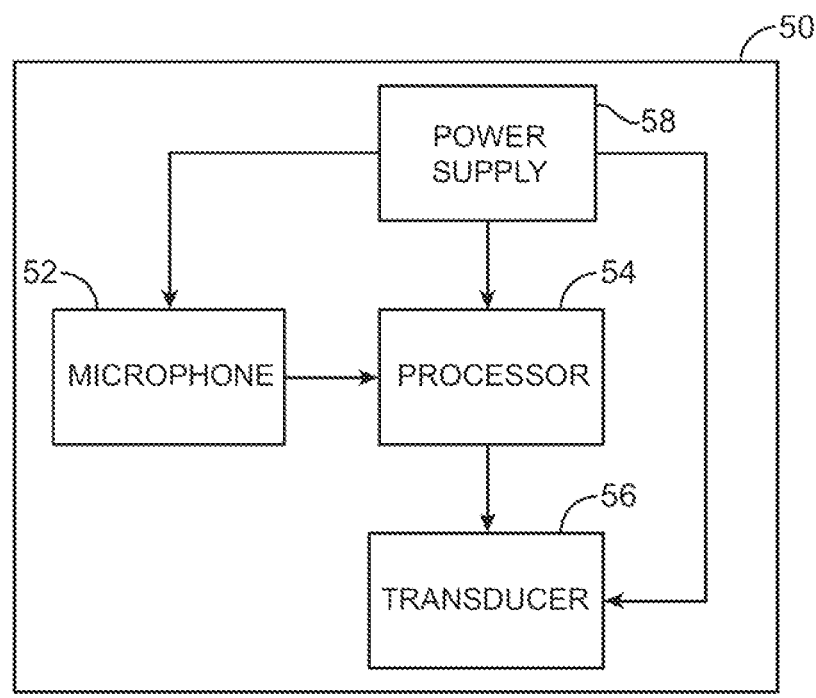
FIG. 5 shows an illustrative configuration of another variation of the device in which the entire assembly is contained by the oral appliance within the user's mouth.

In another variation of assembly 16, rather than utilizing an extra-buccal transmitter, hearing aid assembly 50 may be configured as an independent assembly contained entirely within the user's mouth, as shown in FIG. 5. Accordingly, assembly 50 may include at least one internal microphone 52 in communication with an on-board processor 54. Internal microphone 52 may comprise any number of different types of microphones, as described below in further detail. At least one processor 54 may be used to process any received auditory signals for filtering and/or amplifying the signals and transmitting them to transducer 56, which is in vibratory contact against the tooth surface. Power supply 58, as described above, may also be included within assembly 50 for providing power to each of the components of assembly 50 as necessary.

In order to transmit the vibrations corresponding to the received auditory signals efficiently and with minimal loss to the tooth or teeth, secure mechanical contact between the transducer and the tooth is ideally maintained to ensure efficient vibratory communication. Accordingly, any number of mechanisms may be utilized to maintain this vibratory communication.

Figure 6:
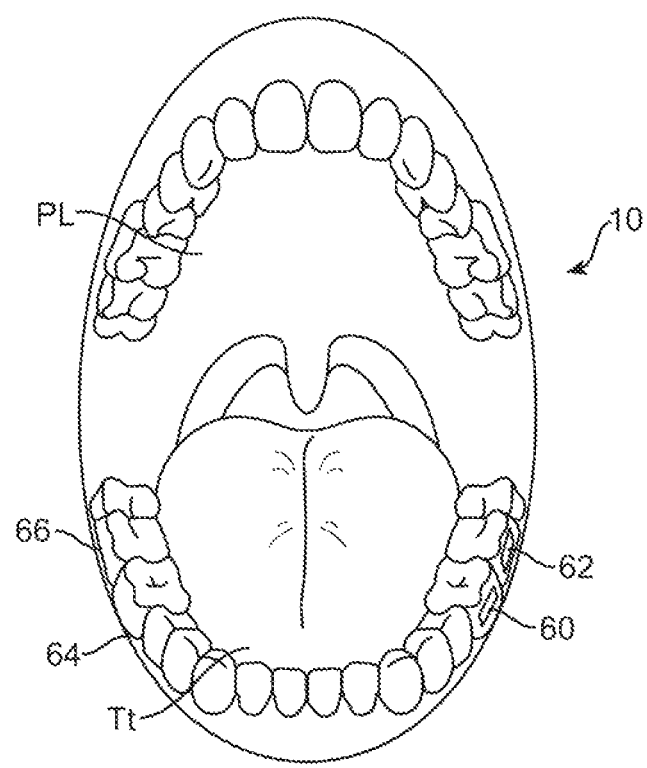
FIG. 6 illustrates an example of how multiple oral appliance hearing aid assemblies or transducers may be placed on multiple teeth throughout the patient's mouth.

For any of the variations described above, they may be utilized as a single device or in combination with any other variation herein, as practicable, to achieve the desired hearing level in the user. Moreover, more than one oral appliance device and electronics and/or transducer assemblies may be utilized at any one time. For example, FIG. 6 illustrates one example where multiple transducer assemblies 60, 62, 64, 66 may be placed on multiple teeth. Although shown on the lower row of teeth, multiple assemblies may alternatively be positioned and located along, the upper row of teeth or bath rows as well. Moreover, each of the assemblies may be configured to transmit vibrations within a uniform frequency range. Alternatively in other variations, different assemblies may be configured to vibrate within overlapping or non-overlapping frequency ranges between each assembly. As mentioned above, each transducer 60, 62, 64, 66 can be programmed or preset for a different frequency response such that each transducer may be optimized for a different frequency response and/or transmission to deliver a relatively high-fidelity sound to the user.

Moreover, each of the different transducers 60, 62, 64, 66 can also be programmed to vibrate in a manner which indicates the directionality of sound received by the microphone worn by the user. For example, different transducers positioned at different locations within the user's mouth can vibrate in a specified manner by providing sound or vibrational queues to inform the user which direction a sound was detected relative to an orientation of the user, as described in further detail below. For instance, a first, transducer located, on a user's left tooth, can be programmed to vibrate for sound detected originating from the user's left side. Similarly, a second transducer located, e.g., on a user's right tooth, can be programmed to vibrate for sound detected originating from the user's right side. Other variations and queues may be utilized as these examples are intended to be illustrative of potential variations.

Figure 7:
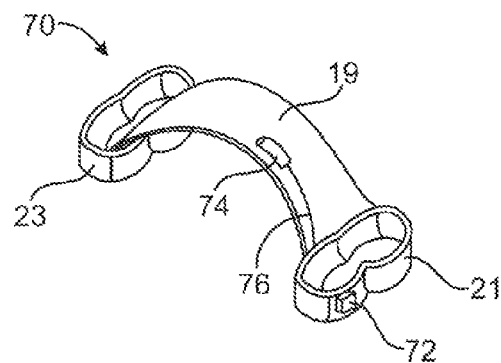
FIG. 7 illustrates another variation of a removable oral appliance supported by an arch and having a microphone unit integrated within the arch.

FIG. 7 illustrates another variation 70 which utilizes an arch 19 connecting one or more tooth retaining portions 21, 23, as described above. However, in this variation, the microphone unit 74 may be integrated within or upon the arch 19 separated from the transducer assembly 72. One or more wires 76 routed through arch 19 may electrically connect the microphone unit 74 to the assembly 72. Alternatively, rather than utilizing a wire 76, microphone unit 74 and assembly 72 may be wirelessly coupled to one another, as described above.

Figure 8A:
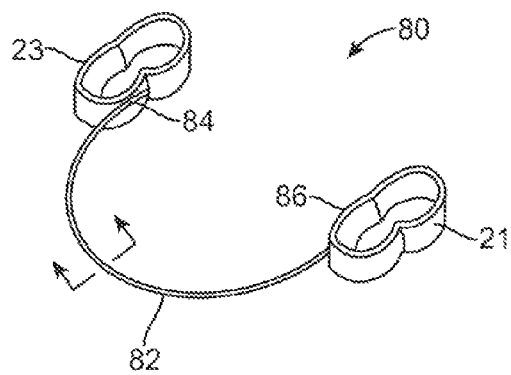
FIG. 8A illustrates another variation of the removable oral appliance supported by a connecting member which may be positioned along, the lingual or buccal surfaces of a patient's row of teeth.
Figure 8B:
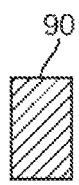
FIGS. 8B to 8E show examples of various cross-sections of the connecting support member of the appliance of FIG. 8A.
Figure 8C:
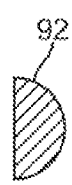
Figure 8D:
Figure 8E:
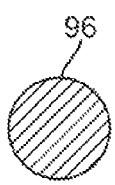

FIG. 8A shows another variation 80 which utilizes a connecting member 82 which may be positioned along the lingual or buccal surfaces of a patient's row of teeth to connect one or more tooth retaining portions 21, 23. Connecting member 82 may be fabricated from any number of nontoxic materials, such stainless steel, Nickel, Platinum, etc. and affixed or secured 84, 86 to each respective retaining portions 21, 23. Moreover, connecting member 82 may be shaped to be as non-obtrusive to the user as possible. Accordingly, connecting member 82 may be configured to have a relatively low-profile for placement directly against the lingual or buccal teeth surfaces. The cross-sectional area of connecting member 82 may be configured in any number of shapes so long, as the resulting geometry is non-obtrusive to the user. FIG. 8B illustrates one variation of the cross-sectional area which may be configured as a square or rectangle 90. FIG. 8C illustrates another connecting member geometry configured as a semi-circle 92 where the flat portion may be placed against the teeth surfaces. FIGS. 8D and 8E illustrate other alternative shapes such as an elliptical shape 94 and circular shape 96. These variations are intended to be illustrative and not limiting as other shapes and geometries, as practicable, are intended to be included within this disclosure.

Figure 9:
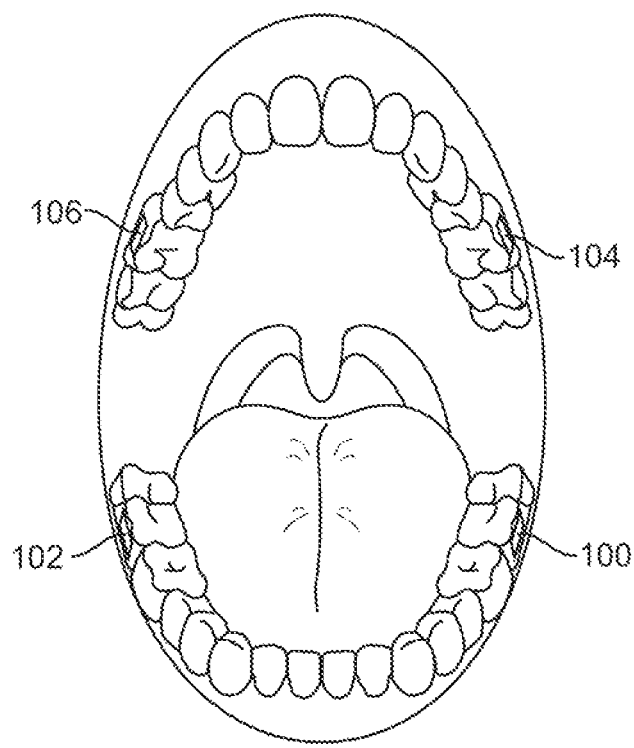
FIG. 9 shows yet another variation illustrating at least one microphone and optionally additional microphone units positioned around the user's mouth and in wireless communication with the electronics and/or transducer assembly.

In yet another variation for separating the microphone from the transducer assembly, FIG. 9 illustrates another variation where at least one microphone 102 (or optionally any number of additional microphones 104, 106) may be positioned within the mouth of the user while physically separated from the electronics and/or transducer assembly 100. In this manner, the one or optionally more microphones 102, 104, 106 may be wirelessly or by wire coupled to the electronics and/or transducer assembly 100 in a manner which attenuates or eliminates feedback from the transducer, also described in further detail below.

In utilizing multiple transducers and/or processing units, several features may be incorporated with the oral appliance(s) to effect any number of enhancements to the quality of the conducted vibratory signals and/or to emulate various perceptual features to the user to correlate auditory signals received by a user for transmitting, these signals via sound conduction through teeth or bone structures in and/or around the mouth.

Figure 10:
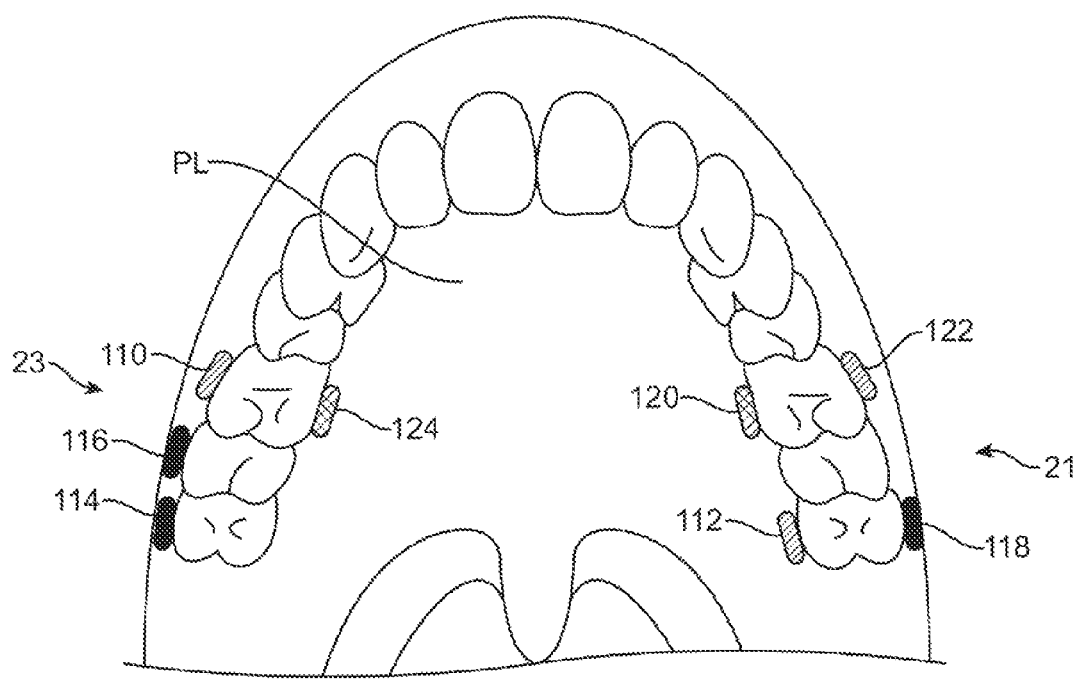
FIG. 10 illustrates yet another example of a configuration for positioning multiple transducers and/or processing units along a patient's dentition.

As illustrated in FIG. 10, another variation for positioning one or more transducers and/or processors is shown. In this instance generally, at least two microphones may be positioned respectively along tooth retaining portions 21, 23, e.g., outer microphone 110 positioned along a buccal surface of retaining portion 23 and inner microphone 112 positioned along a lingual surface of retaining portion 21. The one or more microphones 110, 112 may receive the auditory signals which are processed and ultimately transmitted through sound conductance via one or more transducers 114, 116, 118, one or more of which may be tuned to actuate only along certain discrete frequencies, as described in further detail below.

Moreover, the one or more transducers 114, 116, 118 may be positioned along respective retaining portions 21, 23 and configured to emulate directionality of audio signals received by the user to provide a sense of direction with respect to conducted audio signals. Additionally, one or more processors 120, 124 may also be provided along one or both retaining portions 21, 23 to process received audio signals, e.g., to translate the audio signals into vibrations suitable for conduction to the user, as well as other providing for other functional features. Furthermore, an optional processor 122 may also be provided along one or both retaining portions 21, 23 for interfacing and/or receiving wireless signals from other external devices such as an input control, as described above, or other wireless devices.

Figure 11A:
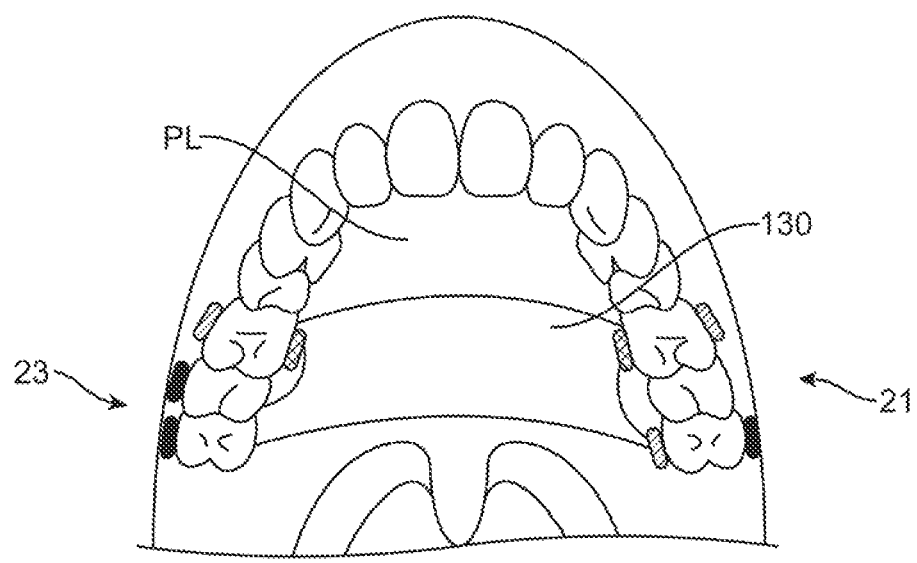
FIG. 11A illustrates another variation on the configuration for positioning multiple transducers and/or processors supported via an arched connector.
Figure 11B:
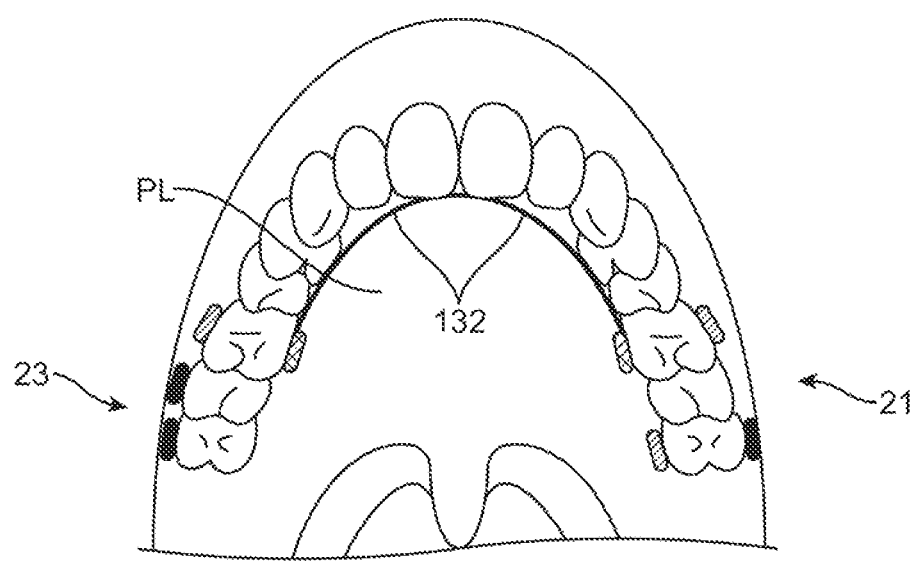
FIG. 11B illustrates another variation on the configuration utilizing a connecting member positioned along the lingual surfaces of a patient's dentition.

FIG. 11A illustrates another configuration utilizing an arch 130 similar to the configuration shown in FIG. 7 for connecting the multiple transducers and processors positioned along tooth retaining portions 21, 23. FIG. 11B illustrates yet another configuration utilizing a connecting member 132 positioned against the lingual surfaces of the user's teeth, similar to the configuration shown in FIG. 8A, also for connecting the multiple transducers and processors positioned along tooth retaining portions 21, 23.

In configurations particularly where the one or more microphones are positioned within the user's mouth, filtering features such as Acoustic Echo Cancellation (AEC) may be optionally utilized to eliminate or mitigate undesired sounds received by the microphones. AEC algorithms are well utilized and are typically used to anticipate the signal which may re-enter the transmission path from the microphone and cancel it out by digitally sampling an initial received signal to form a reference signal. Generally, the received signal is produced by the transducer and any reverberant signal which may be picked up again by the microphone is again digitally sampled to form an echo signal. The reference and echo signals may be compared such that the two signals are summed ideally at 180° out of phase to result in a null signal, thereby cancelling the echo. Examples of AEC as well as other variations for processing audio signals with respect to the assembly are shown and described in greater detail in U.S. patent application Ser. No. 11/672,239, filed Feb. 7, 2007, which is incorporated herein by reference in its entirety.

In utilizing a separate transmitter in communication with the electronics and/or transducer assembly 16 to transfer data and/or auditory information for treatment, the transmitter may be located on or near the user's body in proximity to the oral appliance. In separating the transmitter, communication between the transmitter and oral appliance may be effected by wireless communications utilizing radio waves, as described above. However, typical wireless communications assemblies require increased power levels. Thus, intra-device communications may alternatively be effected by the transmission of signals through or along the user's body itself such as along the skin or through the underlying tissue.

Figure 12:
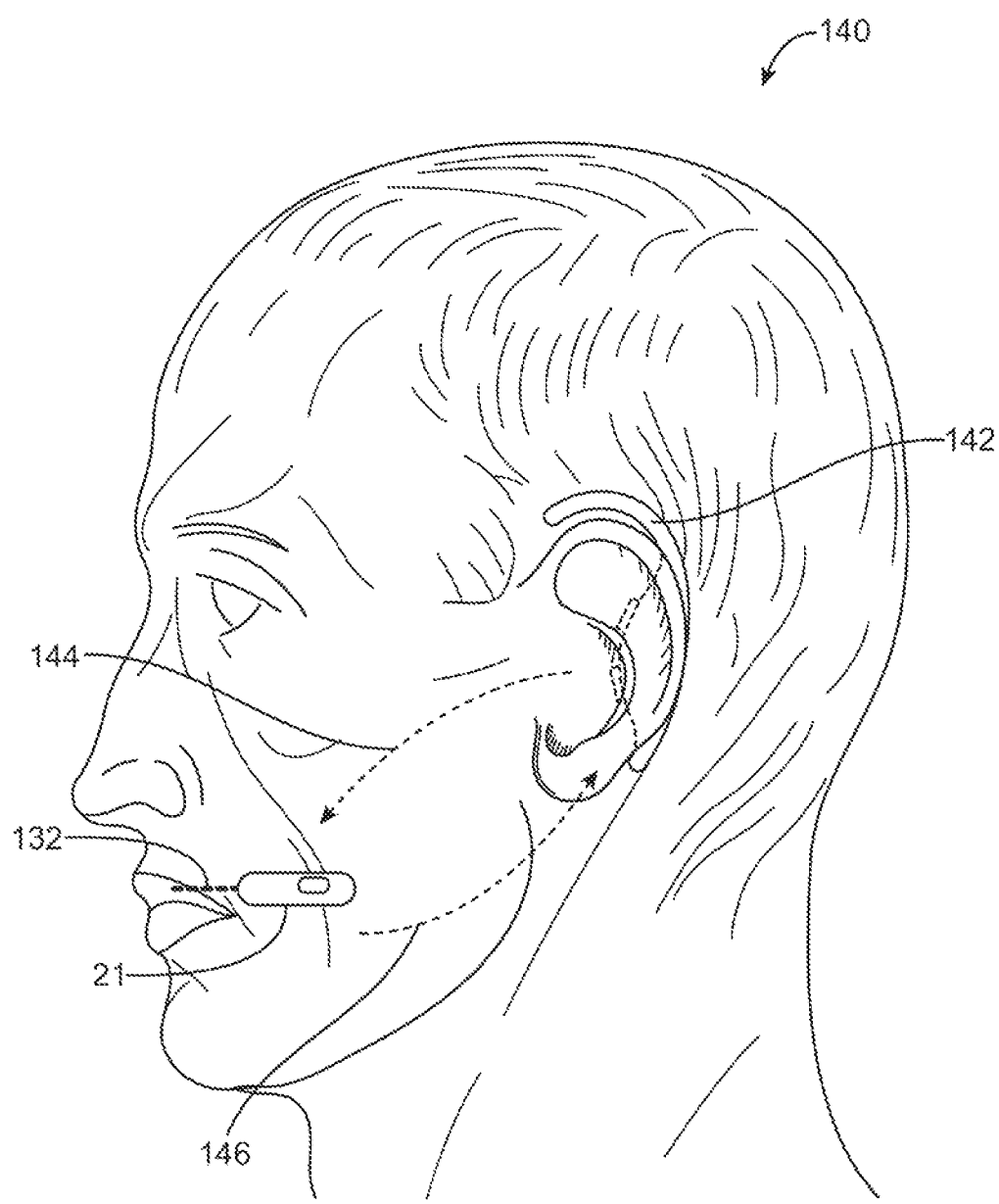
FIG. 12 shows an extra-buccal transmitter assembly positioned behind one or both of the user's ear and communicating with a receiving assembly contained within or along a receiving portion of an oral appliance.

An example of such intra-device linked, communication through the user's body 140 is illustrated in the profile view of FIG. 12, which shows an extra-buccal transmitter assembly 142 positioned, in this example, behind, one or both of the user's ear. The transmitter assembly 142 may receive the data and/or auditory information and convert this information to digitally encode and modulates the data and/or auditory information for transmission over or through the skin and/or underlying tissue, as indicated by the transmitted control signals 144. The receiver assembly contained within retaining portion 21 of the oral appliance, shown positioned within the mouth of the user 140 and retained upon the tooth or teeth, is specifically keyed to receive these digitally encoded signals 144 and to perform any error correction on the signal 144 which is then converted to the audio signal for vibratory conductance to the user 140.

The digitally encoded signal 144 transmitted by transmitter assembly 142 may generally comprise a wideband carrier signal having a shaped noise profile which is injected or transmitted into or along the user's body 140 utilizing a single band at a single frequency ranging anywhere between 100 kHz to 1 GHz. The signal frequency may also exceed 1 GHz, however, higher frequencies may typically require higher power levels with accompanying higher levels of noise and increase loss of the signal.

Moreover, the transmitter assembly 142 and receiver assembly in retaining portion 21 may utilize an imbalanced data transmission where the transmitter 142 sends the digitally encoded data and waits for a predetermined period of time to receive any feedback signals 146 or other information from the receiver, e.g., battery life, user-related data, etc., which may also be relayed from retaining portion 21 back to the transmitting assembly 142 through or along the user's skin or underlying tissue.

The feedback signal 146 may also be utilized to readjust levels by the receiver (e.g., shaped noise) to change the levels transmitted by the transmitter assembly 142 to optimize changes in the levels of injected noise. For instance, when changes in received auditory signals or sounds occur such as a high level of external noise source approaching, the user 140, the receiver may send feedback signals 146 along or through the user's body to the transmitter 142 which then readjusts the injected shaped noise level. Moreover, feedback signals 146 may be utilized to switch modes if added noise from external noise sources at certain areas of frequency bands are higher than acceptable levels.

Figure 13:
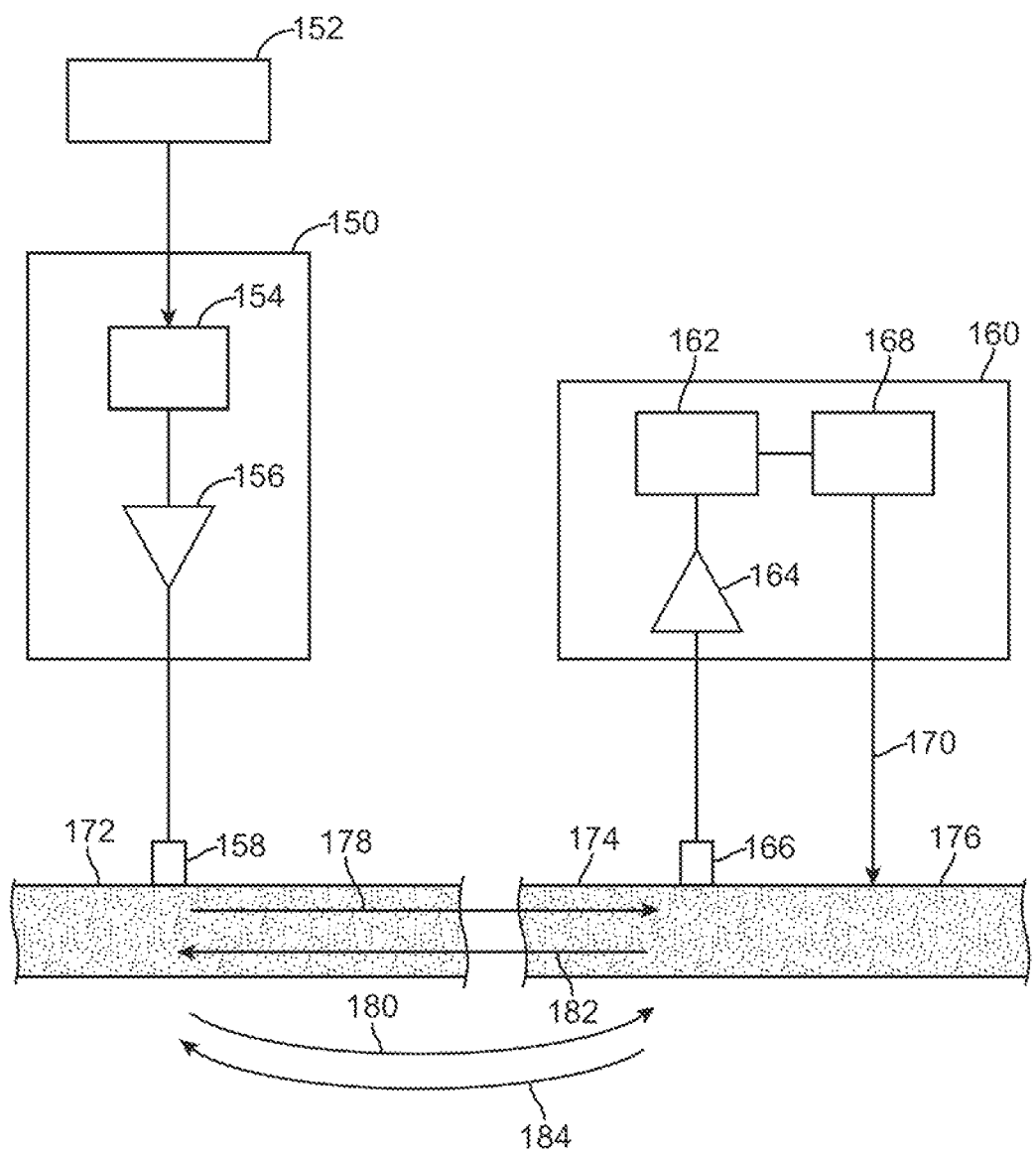
FIG. 13 schematically illustrates an example of the signal transmission through or along the user's body.

The transmitter assembly 150 and receiving assembly 160 located within or along retaining portion 21 is illustrated schematically in FIG. 13 to show an example of the signal transmission through or along the user's body. Transmitter assembly 150 may receive any data and/or auditory information or optional treatment algorithms 152 which are digitally encoded via an encoding assembly 154, such as processor 32 described above running an encoding algorithm. The encoding assembly 154 may be coupled to a variable gain amplifier 156 which locks to a base level of noise and gates the noise level accordingly in the encoded signal, which is then transmitted to a first region of the body 172 (e.g., behind the ear, along the wrist, etc.) via a single electrode 158 coupled to the skin surface. Electrode 158 may be coupled directly to the skin surface 172 or through a coupling interface such as a gel or other conductive medium. Alternatively, electrode 158 may be maintained in proximity to the skin surface 172 with an intermediate protective layer or held at a distance such that no direct contact is made between the electrode 158 and the skin surface 172 and coupling occurs via capacitive coupling. The single electrode 158 may eliminate the need for use of a reference voltage and may also eliminate the need for transmission through earth ground. Alternatively, additional electrodes (e.g., two electrodes) may be used to enhance signal transmission and/or reception if so desired but is not necessary for use.

Once the encoded signal is transmitted through electrode 158, the transmission signal may be transmitted through or along the skin, as indicated by transmission signal 178, or it may be transmitted through or along the underlying tissue, as indicated by transmission signal 180. The transmitted signals 178, 180 may pass through the user's whole body or through a portion of the skin and/or underlying tissue where the power for transmitting the signal ranges in the sub-milliwatt level to a few milliwatts of power, e.g., less than 10 milliwatts.

Optionally and/or additionally, the encoding assembly 154 may further include a scrambler contained within assembly 154 or separate therefrom which may scramble the encoded signal prior to transmission to encrypt the signal. The scrambler may transpose, invert, or otherwise further encode the signal to make the transmitted information unintelligible at the receiver assembly to prevent other unintended persons from picking up and decoding the transmitted information from the user's body.

With encoded signals transmitted from electrode 158 at the first location 172, a receiving electrode 166 which is also in contact with the user's body at a second region 174 (e.g., within the user's mouth along the tooth or teeth, in contact with the inner cheek, a region of the gums, a portion of the tongue, etc.) may receive the encoded signals and transmit them to an amplifier 164 within receiving assembly 160 located within or along retaining portion 21. As the interior of the user's mouth is typically wet with saliva, the reception of the encoded signals 178, 180 may be particularly effective.

The encoded and amplified signals may be decoded via decoding assembly 162, e.g., a processor contained within retaining portion 21, and the decoded data and/or auditory information may be received by a transducer assembly 168 which may then transmit the data and/or auditory information through vibratory conductance 170 into the underlying third region 176 of the user's body such as the underlying tooth or teeth, as described above. If the received information were scrambled, decoding assembly 162 may further include a descrambler contained within or separate therefrom to descramble the received information. As mentioned above, the any feedback or return signals may be similarly transmitted through electrode 166 and into the second region 174 for transmission through or along the user's skin, as indicated by return signal 182, or through the underlying tissue, as indicated by return signals 184.

Figure 14A:
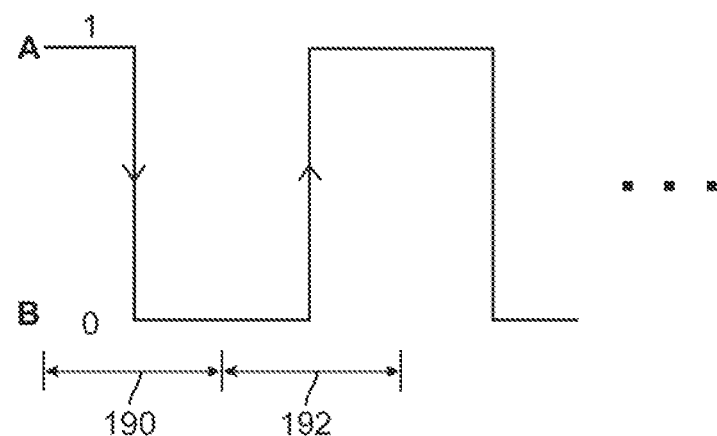
FIGS. 14A and 14B shows an example of a digital encoding scheme for encoding data and/or auditory information to be transmitted along or through the user's body.
Figure 14B:
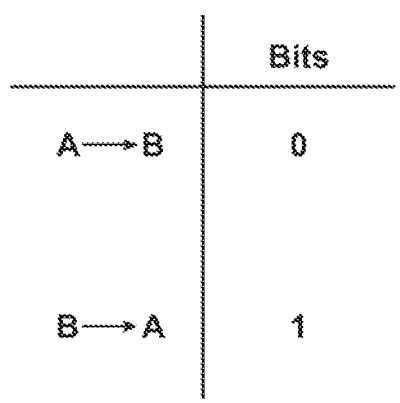

In digitally encoding the data and/or auditory information or treatment signal 152, a number of encoding algorithms may be employed. One example of an encoding algorithm which may be utilized is a Winchester encoding algorithm, as known in the art. As schematically illustrated in FIG. 14A, Winchester encoding utilizes a minimum level of noise whereby a base level is considered "0" and changes to the static coding or peak levels of noise are considered "1". Thus, a first encoded bit 190 for a noise level going from "A" to "B" may be assigned to a transmitted bit value of "0", as indicated by the chart of FIG. 14B. A second encoded bit 192 may be assigned a value of "1" for increased noise levels, as indicated from "B" to "A" where for any increased noise levels, the noise level is peaked and the data and/or auditory information to be transmitted is digitally encoded accordingly. The noise level is shaped to have an area consistent with sufficient transmission and each frequency band is different. In this manner, the data and/or auditory information 152 may be encoded for transmission along or through the user's body to the receiver assembly. The receiving assembly may thus receive this encoded signal and decode the signal correspondingly, e.g., for vibratory transmission to the user.

Figure 15:
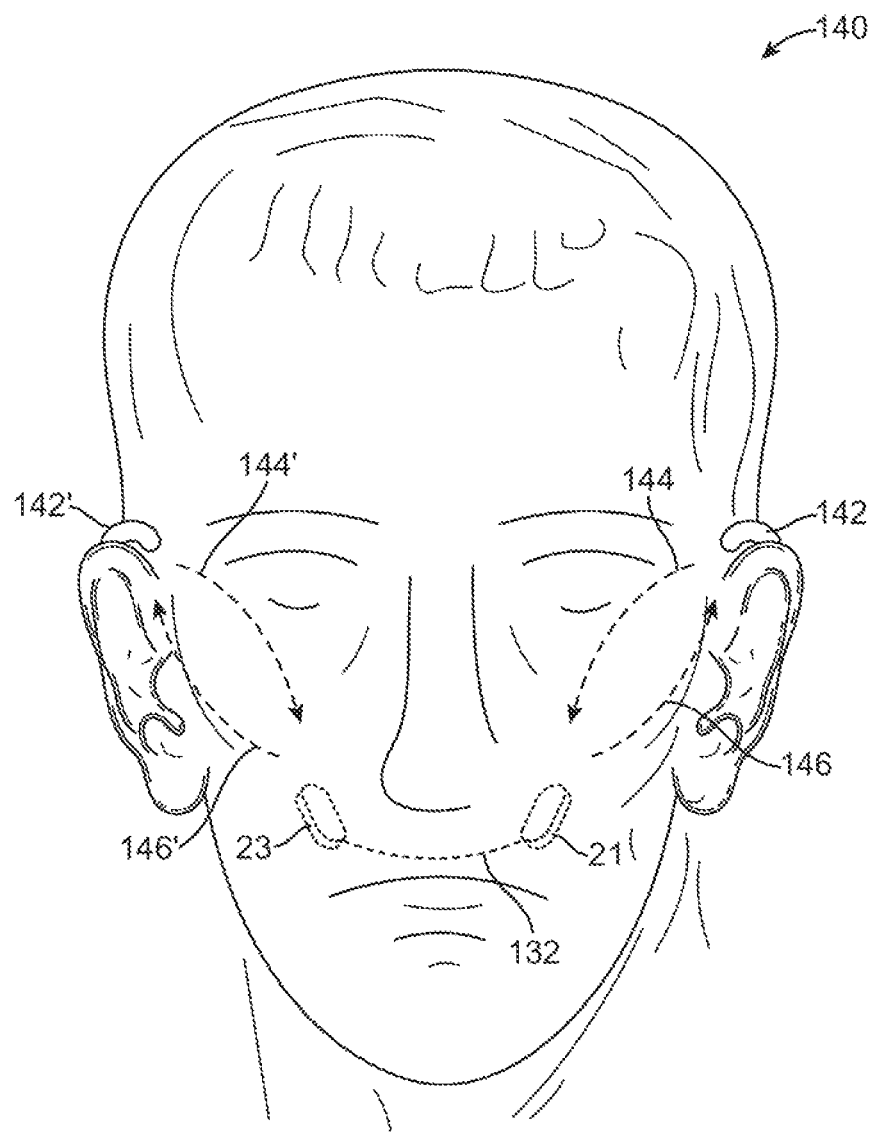
FIG. 15 shows a pair of transmitting assemblies placed behind each ear of the user communicating with multiple receiver assemblies.
Figure 16:
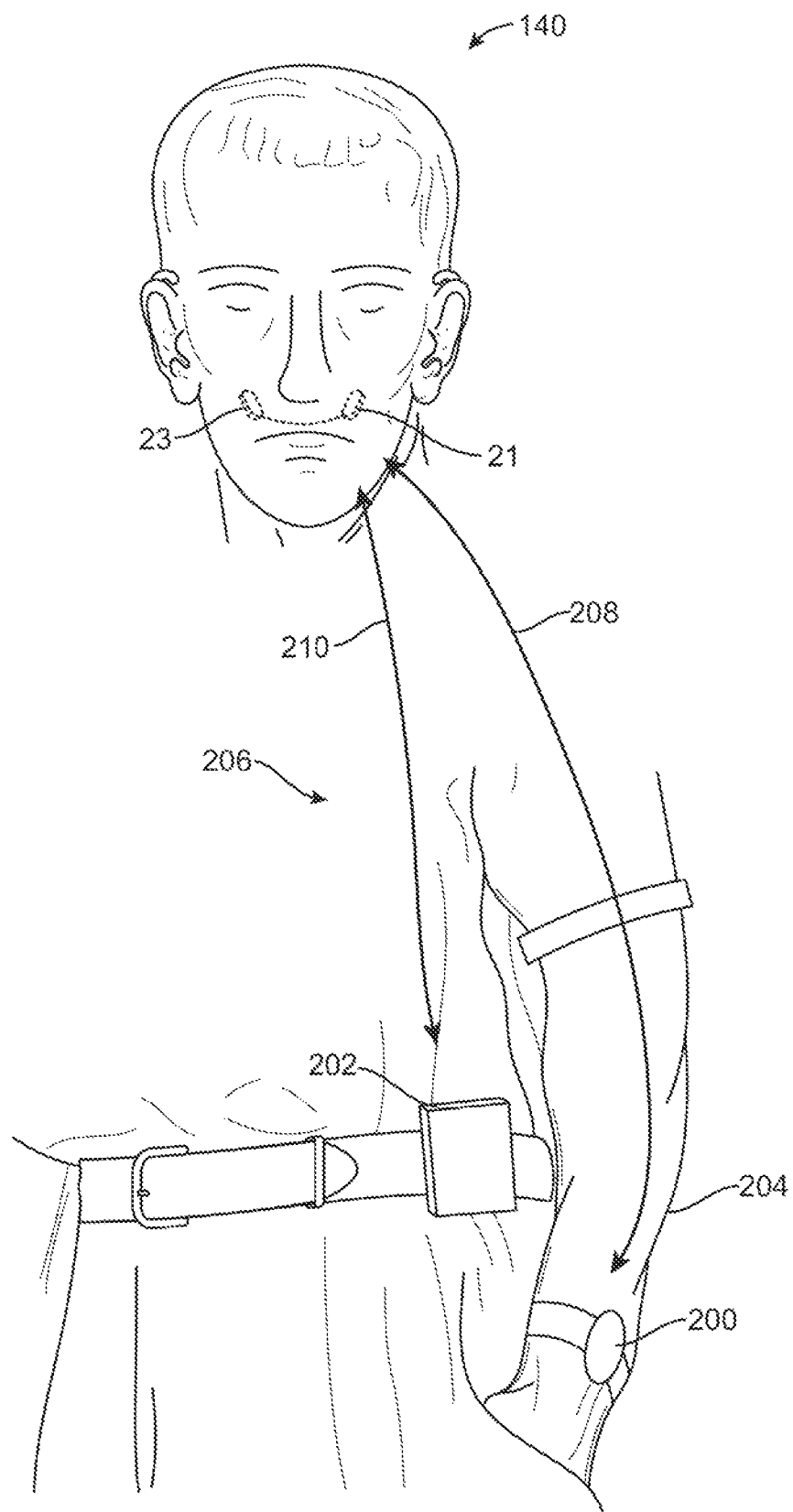
FIG. 16 shows an example of various locations where a transmitter assembly may be positioned over the user's body for communication with the oral appliance.

In other variations, a pair of transmitting assemblies 142, 142' may be utilized behind each ear of user 140, as shown in FIG. 15. In this manner, each assembly 142, 142' may communicate with a single receiving assembly along retaining portion 21 or with two or more receivers along both retaining portions 21, 23. The example shown illustrates a variation where transmitting assemblies 142, 142' may communicate 144, 144' with respective receiver assemblies in respective retaining portions 21, 23. Likewise, feedback or return signals 146, 146' may be transmitted from the receiver back to each respective transmitter as well. If two or more electrodes are utilized, each electrode may be positioned on opposite sides of the user's mouth along both retaining portions 21, 23 as well.

Because the user's body is utilized as a conductive transmission link, the transmitter assembly may be placed at various locations over the body. For example, a transmitter assembly may be configured as a watch 200 and worn on the user's wrist such that conducted signals 208 are transmitted through the user's arm 204 to the receiving assemblies in receiving portion 21 and/or 23. Likewise, the transmitter assembly 202 may be configured as a PDA, music player, etc., which may be worn on the user's belt or other clothing. The conducted signals 210 may be transmitted along the user's torso 206 where the transmitter 202 is capacitively coupled to the user's underlying skin surface.

The applications of the devices and methods discussed above are not limited to specific treatments. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A data and audio signal transmission system for communication over a body of a user, comprising:
   a transmitter assembly in electrical communication through a single electrode adapted to be electrically coupled in contact with a skin surface at a first region of the body and where the transmitter assembly is adapted to transmit a data signal over or through the skin surface or underlying tissue of the body;

a receiver assembly electrically coupled with the skin surface at a second region of the body and adapted to receive the data signal transmitted through the skin surface or underlying tissue of the body by the transmitter assembly;

a transducer assembly positioned within or along a housing which is configured for placement within a mouth of the user, wherein the transducer assembly is in electrical communication with the receiver assembly and includes a transducer configured to contact at least one tooth and vibrationally conduct the data signal through the at least one tooth; and one or more microphones in electrical communication with the transmitter assembly.

2. The system of claim 1 wherein the transmitter assembly is in electrical communication with the skin surface in or around an ear of the user.

3. The system of claim 1 wherein the receiver assembly is housed within or along the housing within the mouth of the user.

4. The system of claim 1 wherein the transmitter assembly is adapted to encode the data signal prior to transmission over or through the skin surface or underlying tissue of the body.

5. The system of claim 4 wherein the transmitter assembly is further adapted to scramble the data signal prior to transmission.

6. The system of claim 5 wherein the receiver assembly is adapted to decode the data signal received from the skin surface or underlying tissue of the body.

7. The system of claim 6 wherein the receiver assembly is further adapted to descramble the data signal.

8. The system of claim 1 wherein the at least one microphone is in wireless communication with the transmitter assembly.

9. The system of claim 1 wherein the one or more microphones is positioned within the mouth of the user.

10. The system of claim 1 wherein the one or more microphones is positioned external to the mouth of the user.

* * * * *